INVENTORS
ROSCOE R. LOBOSCO
ROBERT DEAN, JR.
EDWARD J. RULAND, JR.
BY Barnwell R. King
ATTORNEYS `3,041,445`
ELECTRIC ARC WORKING AND CONTROL SYSTEMS THEREFOR
Roscoe R. Lobosco, Fanwood, Robert Dean, Jr., Kearny, and Edward J. Ruland, Jr., West Caldwell, N.J., assignors to Union Carbide Corporation, a corporation of New York
Filed Jan. 16, 1961, Ser. No. 82,998
11 Claims. (Cl. 219—131)

This invention relates to electric arc working, and more particularly to arc-voltage control systems for non-consumable electrode, inert gas shielded, work-in-circuit, electric arc welding and cutting.

The invention provides an inert-gas non-consumable electrode system comprising automatic torch height adjustment means for maintaining an arc voltage constant by moving a torch up and down, means for freeing the torch of such means, means for bringing said torch down approximately to a desired height, means for the stopping further movement of the torch, means initiating an arc between such torch and the work, and after a predetermined time interval means for returning the torch height adjustment to said automatic means.

In gas-shielded, non-consumable electrode arc seam welding, the penetration and width of the welding bead are determined by the arc voltage; and the uniformity of the bead width depends upon maintaining such arc voltage relatively constant. In mechanized welding of this type, means have been provided for maintaining such arc voltage constant as the welding progresses by automatically raising or lowering the torch as necessary to maintain a constant arc length. Since the arc voltage varies directly with the length of the arc, when the torch is moved away from the work, the arc voltage increases. Conversely, when the torch is moved toward the work, the arc voltage decreases.

This has been accomplished in the past by matching the actual arc voltage against a preset reference voltage which is adjusted to be equal to the desired arc voltage. The preset reference voltage selected depends upon a number of factors such as the bead width desired, the workpiece thickness, the current to be used, the desired depth of penetration, etc., during welding. Deviations from the preset reference voltage are picked up by an error voltage amplifier, the output of which is fed to thyratrons which control a torch head motor to move the torch in the required direction to correct the voltage error, such that the actual arc voltage automatically returned to the same value as the reference voltage.

Such control may be used for conventional DCSP, DCRP, or balanced wave A.C. welding with either high-frequency or retract starting. Though such control may be used with either high-frequency or retract starting, where contamination of the electrode is an undesirable factor, such as in aluminum welding, high-frequency starting is preferred. When high-frequency starting is used to initiate the welding arc, the downward movement of the torch in its travel to the welding position actuates a limit switch which turns on the high-frequency current. The high-frequency is turned on before the desired electrode-to-work distance has been attained. Thus, after the high-frequency is on, the downward travel of the torch is continued until the electrode-to-work gap distance is of a length such that the welding current will follow the conductor path established by the high-frequency current across the gap to establish an arc to the workpiece.

When using high-frequency arc initiation with balanced wave A.C. there is a tendency for the electrode to plunge into the workpiece during arc initiation, due to the time interval required for the arc to become stabilized when it is first ignited. That is, should the high-frequency fail to jump the gap from the electrode to the workpiece (path does not become sufficiently ionized) or, having jumped, should the arc fail to become stabilized immediately and so become extinguished, the continued downward movement of the torch causes the electrode to plunge into the workpiece or plate. The same is true to a lesser extent when using conventional D.C. to weld under some process conditions.

When the electrode plunges into the plate, it becomes contaminated by contact with the workpiece. In the case of smaller diameter electrodes, they may well be bent or broken. In either case, the bent and/or contaminated end must be removed and the electrode reset or readjusted. In some instances, the electrode may become welded to the workpiece when it plunges into the plate. Should this occur, it then becomes necessary to break off the electrode and chip the welded section of the electrode out of the workpiece to prevent the weld from being contaminated with tungsten inclusions. All of such corrective measures result in considerable time loss; and, in mechanized production operations, such time losses are extremely costly.

A related problem which arises after arc has been established, when using such prior control with either high-frequency or retract starting, is one of initial hunting (oscillation) or overcompensation when the voltage control first begins to control the arc length (the arc voltage) by up or down movement of the torch. A sensitivity control regulates the response of the voltage control to errors in arc voltage caused by such things as deviations in the contour of the workpiece or the contour of a previously laid bead; that is, misalignment between the torch and the workpiece, etc., is adjusted to meet the process requirements.

Such sensitivity control is adjustable depending upon the arc length being used for the particular welding operation. Usually, it is desirable to use the highest sensitivity which can be used without causing hunting, since this will cause the control to hold most closely the desired arc voltage. If the control is set to the optimum sensitivity while welding, it is likely that this sensitivity will be too high while making a start, with the result that the torch may plunge into the workpiece or hunt so violently that it will stub the workpiece. On the other hand, if the sensitivity is set low enough to make a good start, the control will not maintain the arc voltage as well as if it were set to a higher value of sensitivity.

The problem of plunging of the electrode into the workpiece during arc initiation, as outlined above, has been overcome, according to the present invention, by providing means in an improved control circuit for halting movement of the torch automatically for a limited time interval when the high-frequency limit switch is actuated. Such time interval permits the arc to be established and stabilized before returning the torch movement to the control circuit. This greatly reduces the incidence of bad starts. Such means comprises essentially a normally closed contact of the high-frequency relay which opens when the high-frequency relay is energized by activation of the high-frequency limit switch. When this normally closed contact opens, it de-energizes the head "down" relay, which, in turn, stops the torch positioning drive motor.

In a prior control, the high-frequency limit switch was set to be actuated at some distance above the work greater than the desired arc length and downward movement of the torch continued. Also, the high-frequency was automatically turned off as soon as an arc was established. Such automatic de-energizing of the high-frequency occurred whether or not the arc had become stabilized.

In the improved control of the invention, the high-frequency limit switch is set to be actuated when the torch is at or near the desired length and the movement of the torch is interrupted at this point. This interruption is of sufficient duration to ensure the establishment of a stable arc. Also, the high-frequency remains on, even after an arc is established, for the duration of time interval in order to ensure that the arc, once established, will not sputter or go out before it is fully stabilized. This predetermined time interval starts when the welding current relay is energized, as will be explained in more detail below. During such time interval, the voltage control is inactive. At the end of the preset time interval, the high-frequency is automatically de-energized and the voltage control begins to function.

An alternative method for use with the improved control to prevent the plunging of the electrode into the workpiece on arc initiation is the same as the above method up to the point when the high-frequency limit switch is actuated and the downward movement of the torch is interrupted. At this point, instead of the high-frequency being maintained, as in the first method, after arc initiation for a time sufficient to permit the arc to become stabilized, the high-frequency is de-energized as soon as an arc is established and the voltage control immediately starts operating. The means for detecting the fact that an arc has been established comprises a welding current relay whose contacts close when welding current is flowing in the welding circuit. However, the voltage control starts operating at a higher voltage than the desired voltage (or preset voltage) for a predetermined time period to permit the arc to become stabilized at such higher voltage.

High voltage arcs (longer length arcs) tend to become stabilized more quickly than do lower voltage arcs; and at higher voltages, more variation is permissible without interrupting the arc. After this predetermined time period, the voltage is automatically lowered to the desired welding voltage. The length of the predetermined time period depends upon the current to be used, the material thickness of the workpiece, and other process conditions.

The problem of hunting or overshooting when the voltage control begins to function after an arc has been initiated has been eliminated, according to the invention, by using a novel system provided with automatic means which causes the control to have a low sensitivity at the instant it takes control and which thereupon smoothly builds up the sensitivity to the maximum preselected value.

This has been achieved in the improved control system by the inclusion of a condenser in parallel with the sensitivity potentiometer in the error voltage amplifier circuit. Such condenser, together with a resistor (potentiometer), causes the circuit to have a time constant which causes a gradual build-up of the control screen grid voltage on the two amplified tubes and thus gradually builds up their amplification. Depending upon whether an over voltage error or an under voltage error exists, the amplifier tubes amplify the error signal and deliver it to the control grids of one of the two thyratron tubes in the torch positioning motor circuit. Such thyratron tubes control the direction of rotation of the torch positioning drive motor to either raise or lower the torch to correct the error. The gradual build-up of the control screen grid voltage to the amplifier tubes due to the presence of the condenser results in a similar gradual build-up of the error voltage to the thyratron tubes. Such gradual build-up in error voltage eliminates hunting or overshooting of the voltage control.

The following description of the operation of the invention will be better understood if reference is made to the accompanying drawings, in which.

A.C. Operation

For A.C. operation, a balanced wave welding power supply PS is required. If the high frequency unit is not built into the power supply, an external high-frequency generator 52 may be used. For proper operation of the improved control on A.C. a 115-volt A.C. supply, FIG. 2, to the control should be connected to the same phase as the primary supply to the balanced wave power supply PS, FIG. 1. A stepdown transformer, not shown, is used for this purpose. Voltage pick-up leads L, L are connected between the balanced wave A.C. transformer and the high-frequency generator 52.

Figure 1:
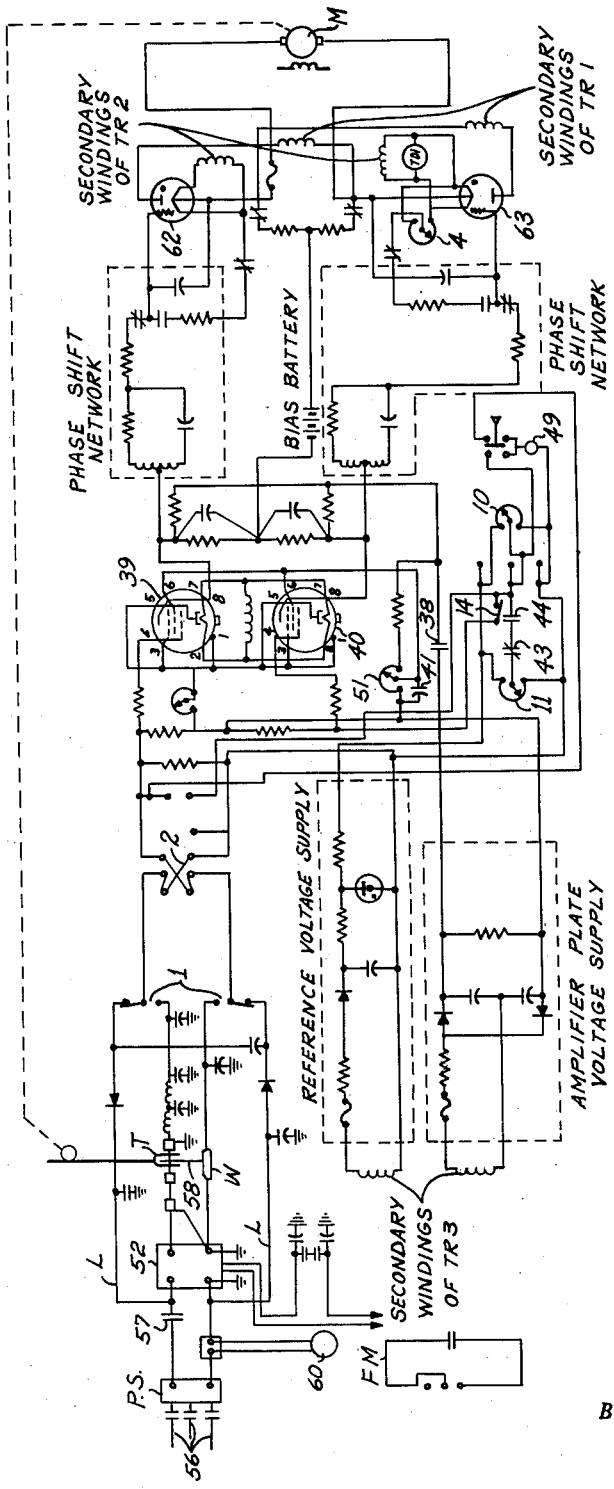
FIG. 1 is a one-half of a circuit diagram illustrating the invention.

Before starting the welding operation between torch T and work W using A.C., D.C. switch 1 is placed in the A.C. position, as indicated in FIG. 1, and A.C./SP-RP switch 2 placed in the A.C./SP position, as shown. A manually operated inch-up-down switch 3, FIG. 2, permits, through energization of motor M, FIG. 1, raising and lowering of the torch T, FIG. 1, for alignment purposes without the danger of establishing an arc. The field F, FIG. 2, of motor M is constantly energized by a 115 volt supply circuit C. The head "up" limit switch 5, FIG. 2, and the head "down" limit switch 7, when actuated by cams on a torch guide bar, have no effect on movement of the torch T when it is controlled by the inch-up-down switch 3. When inch-up-down switch 3 is manually held in the down position, a head down relay 8 is energized and the torch T lowers at a speed selected by adjustment of the potentiometer 4, FIG. 1. Releasing switch 3, FIG. 2, stops the downward movement of the torch T. When the switch 3 is manually held in the up position, a head "up" relay 9 is energized, and the torch T is raised at a constant speed. Releasing switch 3 stops the upward movement of the torch T. Having aligned the torch T in position over the weldment W, FIG. 1, the next step is to strike an arc to begin the welding operation.

Figure 2:
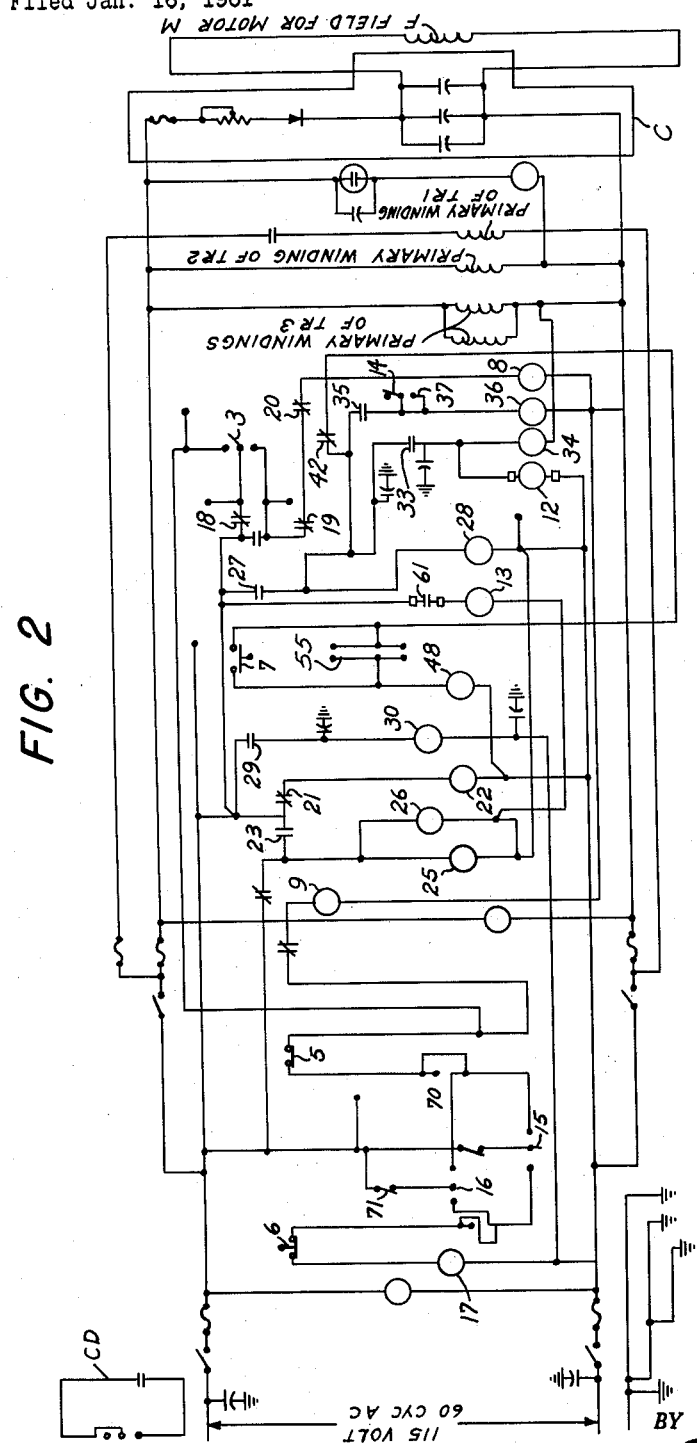
FIG. 2 is the other half thereof.

For A.C. welding with short arc lengths, we have discovered that it is beneficial for the arc to become stabilized before the arc length is controlled. If the arc length is controlled as soon as the arc is established, the electrode tends to plunge into the workpiece and either stick, or become contaminated as outlined above. Two methods of delaying the controlling of the desired arc length, briefly described above, are provided in the improved control system of the invention. Both methods include the use of a condenser 41, FIG. 1, in parallel circuit relation with a sensitivity potentiometer 51 to prevent hunting or over-shooting when the automatic voltage control first goes into operation. The operation of such two methods are described in detail below. In the first method (method 1), automatic controlling of the arc length (arc voltage) is delayed until the arc becomes stabilized, and then it is transferred to automatic arc length control. To accomplish this, as shown in FIG. 2, a delay timer 12, relay 13, and weld start selector switch 14 are provided. The sequence of operations is as follows when the weld start selector switch 14, a double throw switch, is manually placed in the "delay" position:

(1) Weld start switch 15 is manually put in the "Down" position.

(2) Weld start relay 17 is energized.

(3) Normally closed contact 18 of relay 17 opens and removes control of the torch movement from the inch-up-down switch 3.

(4) Normally open contact 24 of relay 17 closes and energizes head down relay 8 through normally closed contacts 19 of relay 48 and 20 of relay 34. The torch moves down at a predetermined speed set by the inch down speed potentiometer 4, FIG. 1.

(5) Normally closed contact 21 of relay 17 opens, de-energizing a gas and water post-flow timer 22.

(6) Normally open contact 23 of relay 17 closes and energizes an argon solenoid valve 25 and water solenoid valve 26, turning on gas and water supplies to the torch.

(7) Normally open contact 27 of relay 17 closes and energizes welding power relay 28.

(8) Normally open contact 29 of relay 28 closes, energizing welding contactor 30.

(9) Normally open contact 56 or 57 closes, energizing the torch T.

(10) Normally open contact 31 of relay 28 closes, but the high-frequency unit 52 is not energized because contact 32 of relay 48 is still open.

(11) The torch T lowers until the high-frequency limit switch 7 is actuated by the cam on the torch guide bar and energizes high-frequency relay 48.

(12) Normally open contact 32 of relay 48 closes, energizing the high-frequency unit 52.

(13) Normally closed contact 19 of relay 48 opens, de-energizing the head down relay 8 and stopping the downward movement of the torch T. The high-frequency supply ionizes a path between the electrode 58 in torch T and the workpiece W and an arc is established.

(14) After an arc is established, welding current flows in the welding circuit, energizing welding current relay 60. Normally open contact 33 of relay 60 closes, energizing the transfer relay 34 and delay timer 12. Delay timer 12 thereupon starts to time.

(15) Normally closed contact 20 of relay 34 opens and prevents the head down relay 8 from becoming energized during the remainder of the welding cycle.

(16) Normally open contact 35 of relay 34 closes.

(17) Normally open contact 45 of relay 34 closes, energizing carriage drive motor circuit CD and the torch carriage travel across the workpiece is started. The arc length (arc voltage) is fixed and the voltage control is not functioning at this time. If desired, filter feed motor circuit FM is also energized.

(18) After the delay timer 12 times out, normally open contact 61 closes and relay 13 is energized.

(19) Normally open contact 47 of relay 13 closes and energizes the auxiliary start relay 36.

(20) Normally open contact 38 of relay 36 closes, applying plate and screen grid voltage to error voltage amplifier tubes 39 and 40, and also voltage is applied across sensitivity potentiometer 51. The condenser 41, in parallel with potentiometer 51, causes a gradual build-up of the control screen grid voltage to the two error voltage amplifier tubes 39 and 40. This causes a gradual increase in the amplification of tubes 39 and 40, which, in turn, causes a gradual increase in the control grid voltage applied to one or the other of the thyratron tubes 62 or 63. This action prevents a possible surge of current to the motor which controls the direction of rotation of the torch positioning motor M. Now the arc length is controlled automatically by the voltage adjustment potentiometer 10 (the preset voltage).

(21) Normally closed contact 42 of relay 36 opens, deenergizing high-frequency relay 48.

(22) Contact 19 of relay 48 closes to restore the circuit to the head down relay 8 preparatory to starting another weld when the present welding cycle is completed.

The other method (method 2) of preventing plunging of the electrode into the plate during the period the arc is being initiated and stabilized entails initiating and stabilizing the arc at a higher voltage than the desired welding voltage, and then transferring to the desired present voltage after the arc is stabilized. To accomplish this, two potentiometers 10 and 11, delay timer 12, delay timer relay 13, and a weld start selector switch 14 are provided. The higher starting and stabilizing voltage is set on potentiometer 11, the desired lower welding voltage is set on potentiometer 10 and indicated on voltmeter 49 when push button 50 is actuated. The time duration of the higher starting and stabilizing voltage is determined by the setting of the delay timer 12. These settings will be determined by the actual welding conditions prevailing; that is, thickness of material, type of material, weld bead contour desired, etc. For example, if welding conditions call for a 9 volt arc for welding, the higher starting voltage may be set at 12 or 13 volts. The sequence of operation as follows when weld start selector switch 14 is manually placed in the "step" position.

(1) Weld start switch 15 is manually placed in the "down" position.

(2–16) Same as for method 1.

(17) Auxiliary starting relay 36 is energized through contact 37 of the weld start selector switch 14.

(18) Normally open contact 38 of relay 36 closes, applying plate and screen grid voltage to the error voltage amplifier tubes 39 and 40 and across the sensitivity potentiometer 51. The condenser 41, in parallel with potentiometer 51, causes a gradual build-up of the control screen grid voltage to the two error voltage amplifier tubes 39 and 40. This causes a gradual increase in the amplification of tubes 39 and 40, which, in turn, causes a gradual increase in the control grid voltage applied to either of the thyratron tubes 62 or 63. This prevents a possible surge of current to the motor which controls the direction of rotation of the torch positioning motor.

(19) Normally closed contact 42 of relay 36 opens and de-energizes the high-frequency relay 48. The arc length (arc voltage) is automatically controlled in accordance with the setting of potentiometer 11.

(20) Normally open contact 45 of relay 34 closes and starts the torch machine carrier travel across the weldment.

(21) After delay timer 12 times out, normally open contact 61 closes and relay 13 energizes.

(22) Normally closed contact 43 of relay 13 opens and normally open contact 44 of relay 13 closes. The arc length is now controlled by the setting on potentiometer 10.

The starting and control sequence is the same for D.C. operation as for A.C. operation. However, for D.C. arc voltages of 10 volts and higher (longer arc lengths), the higher starting voltage or the delayed control may not be required. In such case, the setting of potentiometer 11 is the same as potentiometer 10 or delay timer is set for zero, depending upon which method 2, or 1, the machine setup includes. When welding arc voltages lower than 10 volts are to be used, either method 1 or 2 may be used with D.C. operation, and the control will function the same as for A.C. operation. Of course, the D.C./A.C. switch 1 must be placed in the D.C. position. This by-passes the A.C. arc voltage rectifier network necessary for A.C. operation.

An additional feature of the invention is the provision of an auxiliary weld start switch 16, FIG. 2, which permits the establishment of an arc at any point along the weld without having to actuate the high-frequency limit switch 7 in the manner outlined above. This feature is of particular significance when a contoured workpiece is being welded and the welding operation has been interrupted before the weld is completed. In such case, the point on the workpiece at which the arc must be reestablished may well be above or below the normal starting point position. Without the auxiliary weld start switch 16, it would be necessary, under such conditions, to relocate the high-frequency limit switch actuating cam on the torch guide bar in order to re-establish the arc. This is a distinct disadvantage in repetitive mechanized production applications where, desirably, the machine settings are established at the beginning of the production run and maintained for the duration of the run.

The auxiliary weld start switch 16 performs the same function as the weld start switch 15 except that it has an additional contact 55 that is in parallel with the high-frequency limit switch 7. When the switch 16 is placed in the down position, the high-frequency relay 48 is energized and the sequence of operations which follows actuation of the switch 16 is the same as outlined above to start the welding operation. Contact 70 of auxiliary weld start switch 16 is opened when switch 16 is actuated removing the common leg of weld start switch 15 from the circuit. Contact 71 of weld start switch 15 similarly effectively removes switch 16 from the circuit when the weld start switch 15 is actuated. This prevents accidental simultaneous operation of both switches 15 and 16.

If for some reason the torch has been moved from the position it was in when the arc was interrupted, it may be necessary to reposition the torch relative to the workpiece before the auxiliary weld start switch 16 is actuated. This is easily accomplished by using the inch-up-down switch 3, which activates either the head up relay 9 or the head down relay 8, to establish the proper distance between the electrode and the workpiece for initiating the arc.

What is claimed is:

1. An inert-gas non-consumable electrode system comprising automatic torch height adjustment means for maintaining an arc voltage constant by moving a torch up and down, means for freeing the torch of such means, means for bringing said torch down approximately to a desired height, means for the stopping further movement of the torch, means for initiating an arc between such torch and the work, and after a predetermined time interval means for returning the torch height adjustment to said automatic means.

2. In an inert-gas non-consumable electrode system comprising automatic means for maintaining an arc voltage constant by moving a torch up and down, means for initiating an arc and then turning over control of the torch height to said automatic means, including means for initially using a relatively low sensitivity of the voltage control and automatically increasing its sensitivity to a desired maximum value.

3. In an inert-gas non-consumable electrode system comprising automatic means for maintaining an arc voltage constant including means for moving a torch up and down, means for deactivating said automatic means and initiating an arc at a voltage during movement of such torch higher than a desired arc voltage and, after a predetermined time period, transferring control back to said automatic means and thereby reducing the arc voltage the desired voltage as a result of subsequent movement of the torch.

4. In an inert-gas non-consumable electrode system comprising automatic means for maintaining an arc voltage relatively constant by moving a torch up and down, means for initiating an arc at a higher than desired voltage and then reducing the arc voltage to the desired value while the control is in a relatively insensitive condition, and means for automatically increasing the sensitivity of the control to the desired maximum value over a predetermined time interval.

5. In an inert-gas non-consumable electrode system comprising automatic means for maintaining an arc voltage constant by moving a torch up and down, means for bringing the torch down to approximately a desired height, initiating the arc by means of a high-frequency discharge, maintaining such high-frequency discharge until the arc is stabilized, and then turning the torch height over to said voltage control mechanism.

6. In an inert-gas non-consumable electrode arc welding system comprising automatic means for maintaining an arc voltage constant by moving a torch up and down, means for bringing the torch down to approximately a desired height, initiating the arc by means of a high-frequency discharge which is maintained until the arc is stabilized, and then turning the torch height over to said automatic control means at low sensitivity and increasing the sensitivity of the automatic control means to the desired value for welding.

7. In an inert-gas non-consumable electrode system comprising automatic means for maintaining an arc voltage constant by moving a torch up and down, means for initiating the arc at a higher than desired arc voltage, means for transferring to the desired arc voltage while the automatic control is set for low sensitivity and then increasing the sensitivity to the value desired for welding.

8. Method of work-in-circuit gas-shielded refractory electrode arc welding, which comprises moving the end of a refractory electrode toward metal work to be welded in an atmosphere of a suitable protective gas, stopping such movement when such electrode end reaches a predetermined arc distance from such work, simultaneously applying a high-frequency arc starting potential and a welding arc voltage to such electrode and work to start a welding arc in the gap between such electrode end and such work while such electrode is maintained in such stationary position with respect to the work, stabilizing the operation, and then controlling the welding arc voltage by relatively moving such electrode toward and away such work as the welding operation proceeds.

9. Method of welding as defined by claim 8, in which the sensitivity of the welding arc voltage control is made relatively low at the start of such electrode movement and gradually increases to a maximum predetermined value that is adjustable.

10. Method of welding as defined by claim 9, in which the such electrode is moved along a predetermined welding path with respect to the work as soon as the operation is stabilized.

11. Method as defined by claim 8, in which the high frequency potential is maintained for a predetermined time interval to assure positive starting of the welding arc.

References Cited in the file of this patent

UNITED STATES PATENTS

| | | |
|---|---|---|
| 2,832,000 | Steele | Apr. 22, 1958 |
| 2,931,967 | Mills | Apr. 5, 1960 |
| 2,951,972 | Pomazal | Sept. 6, 1960 |